(12) United States Patent
Waggle et al.

(10) Patent No.: US 7,566,192 B2
(45) Date of Patent: Jul. 28, 2009

(54) AXIAL SEATING PIN

(75) Inventors: James M. Waggle, Derry, PA (US); Kevin M. Gamble, Stahlstown, PA (US); Dennis W. McNamara, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/874,988

(22) Filed: Oct. 19, 2007

(65) Prior Publication Data

US 2009/0103991 A1 Apr. 23, 2009

(51) Int. Cl.
*B23C 5/20* (2006.01)
(52) U.S. Cl. .............................. 407/56; 407/35; 407/47
(58) Field of Classification Search .................. 407/35, 407/38–40, 44, 47, 48, 85–87, 67, 102, 103; 408/146, 185
See application file for complete search history.

(56) References Cited

U.S. PATENT DOCUMENTS

| | | | |
|---|---|---|---|
| 2,805,467 A | 9/1957 | Greenleaf | |
| 3,195,376 A * | 7/1965 | Bader | 408/146 |
| 3,378,901 A | 4/1968 | Dupuis | |
| 3,469,296 A * | 9/1969 | Reeve et al. | 407/105 |
| 3,497,934 A * | 3/1970 | Hudson | 407/78 |
| 3,675,290 A | 7/1972 | Mayer | |
| 3,792,517 A * | 2/1974 | Gage | 407/37 |
| 4,353,669 A * | 10/1982 | Striegl | 408/185 |
| 4,602,899 A * | 7/1986 | Vig | 408/153 |
| 5,066,173 A | 11/1991 | Gaffan et al. | |
| 5,217,330 A * | 6/1993 | Dennstedt | 407/37 |
| 5,536,119 A | 7/1996 | Werner et al. | |
| 5,542,793 A * | 8/1996 | Deiss et al. | 407/35 |
| 5,913,644 A | 6/1999 | DeRoche et al. | |
| 6,004,080 A | 12/1999 | Qvarth et al. | |
| 6,155,753 A * | 12/2000 | Chang | 407/92 |
| 6,619,892 B2 * | 9/2003 | Enquist | 407/36 |
| 6,942,431 B2 * | 9/2005 | Pantzar et al. | 407/40 |
| 7,014,393 B2 | 3/2006 | Matheis | |
| 7,114,890 B2 * | 10/2006 | Noggle | 407/36 |
| 7,390,149 B2 | 6/2008 | Wihlborg | |
| 2002/0081168 A1 * | 6/2002 | Kress | 408/179 |
| 2006/0140730 A1 | 6/2006 | Schlagenhauf et al. | |
| 2007/0183857 A1 | 8/2007 | Wihlborg | |

FOREIGN PATENT DOCUMENTS

| | | |
|---|---|---|
| JP | 1-79510 | 3/1989 |
| WO | WO 99/19104 | 4/1999 |

\* cited by examiner

*Primary Examiner*—Boyer D Ashley
*Assistant Examiner*—Sara Addisu
(74) *Attorney, Agent, or Firm*—Larry R. Meenan

(57) ABSTRACT

An axial seating pin contacting and supporting an insert attached to a cutting tool body. The axial seating pin eliminates the need for forming an axial wall on the body of the cutting tool and contributes to the life of the cutting tool by providing a replaceable axial seating pin. The axial seating pin has a shank that slides into an aperture on the tool body and is then held to the body using a fastener.

18 Claims, 4 Drawing Sheets

AXIAL SEATING PIN

FIELD OF THE INVENTION

The present invention relates to machine cutting tools having pockets for receiving inserts, and more specifically to seating pins for supporting the inserts.

BACKGROUND OF THE INVENTION

When machining a metal work piece cutting tools are used to shape the metal into a desired form. The types of cutting tools vary but can include specialized tools that have replaceable inserts to that function as the cutting teeth of the tool for removing metal from the work piece. The inserts are fixed onto the tool body at predetermined locations called pockets.

In some applications inserts can be adjusted in the pocket to control the radial and axial positioning of the insert. One such example of an adjustable insert pin is U.S. Pat. No. 7,014,393, entitled "CLAMPING AND ADJUSTMENT APPARATUS FOR A CUTTING TOOL" which describes a cutting tool having a cutting insert 2 that can be adjusted both radially and axially with respect to the tool body 3. The radial and axial adjustment is accomplished through the use of a wedge pin 12 that is positioned between the insert and the radial wall of the pocket that the insert 2 is mounted in.

As described above pins or wedges have been used for the purpose of adjusting the position of the insert; however, there exists a need for improved arrangements for supporting inserts on the tool body. Traditionally the cutting tool inserts are supported by the walls of the pockets formed on the body. Referring now to FIG. 1, an enlarged perspective view of a prior art cutting tool 100 is depicted. More specifically, the cutting tool 100 has a pocket 122 that receives a cutting insert (not shown). The pocket 122 has a radial wall 126 which supports the insert, a primary seating surface 124 which is where the insert is connected to the cutting tool 100; and an axial wall 125 formed as part of the cutting tool 100. The axial wall 125 is designed to support the insert and prevent it from moving axially; however, the axial wall 125 is subject to unwanted breaking or flexing as the cutting tool 100 works on a work piece. Therefore, it is desirable to resolve the problems encountered with the axial wall.

SUMMARY OF THE INVENTION

The present invention relates to a cutting tool having a body with an axis. A pocket having a primary bearing face and a radial wall formed on the surface of the body. An insert is removably connected to the pocket at the primary bearing face and positioned adjacent the radial wall. An axial seating pin is removably connected to the body and extends at an angle substantially perpendicular to the axis of the body. The axial seating pin has an abutting face that contacts a face of the insert and prevents the insert from moving axially during operation.

DETAILED DESCRIPTION OF THE PREFERRED EMBODIMENTS

Figure 2:
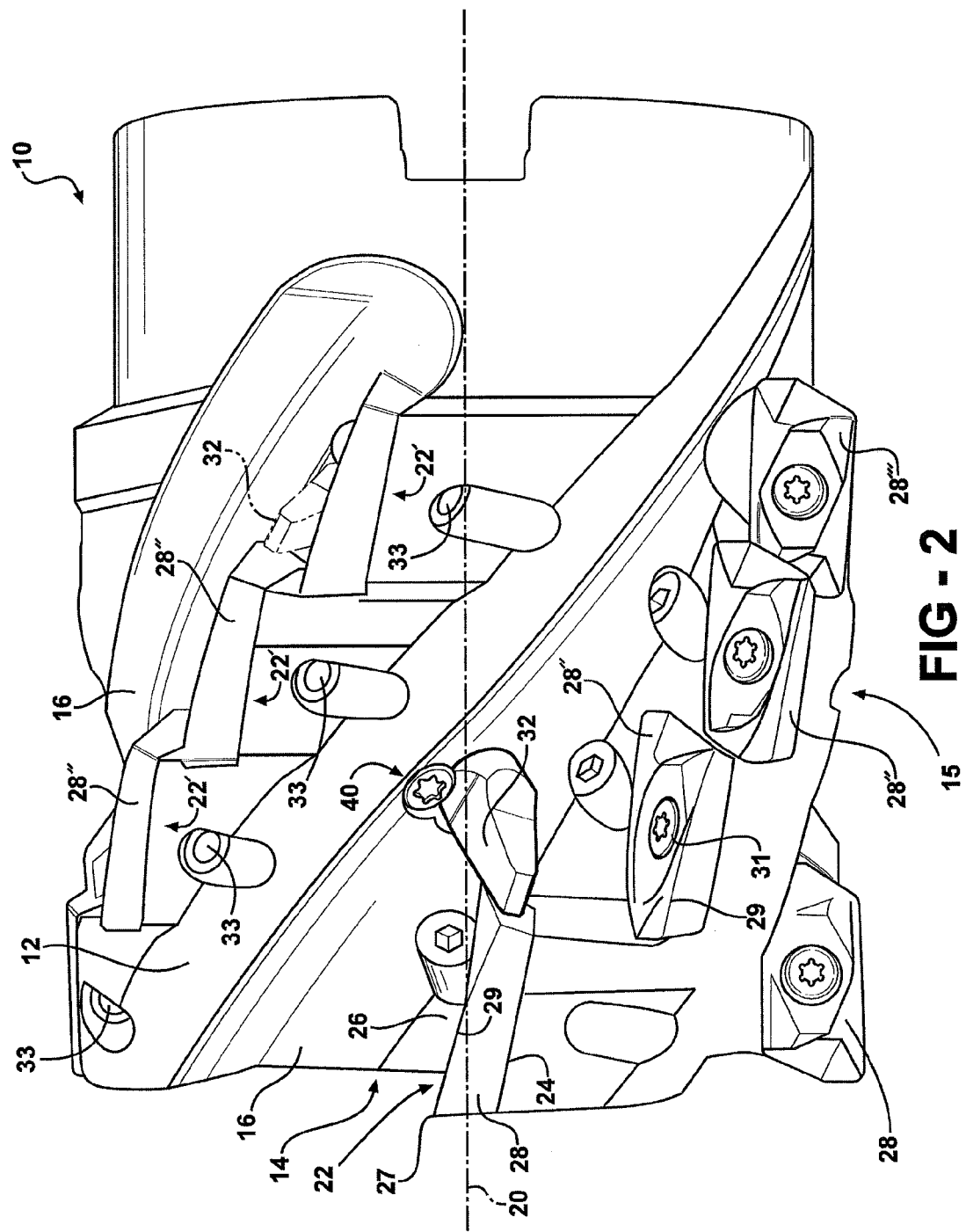
FIG. 2 is a perspective view of the axial seating pin placed on a tool body.
Figure 3:
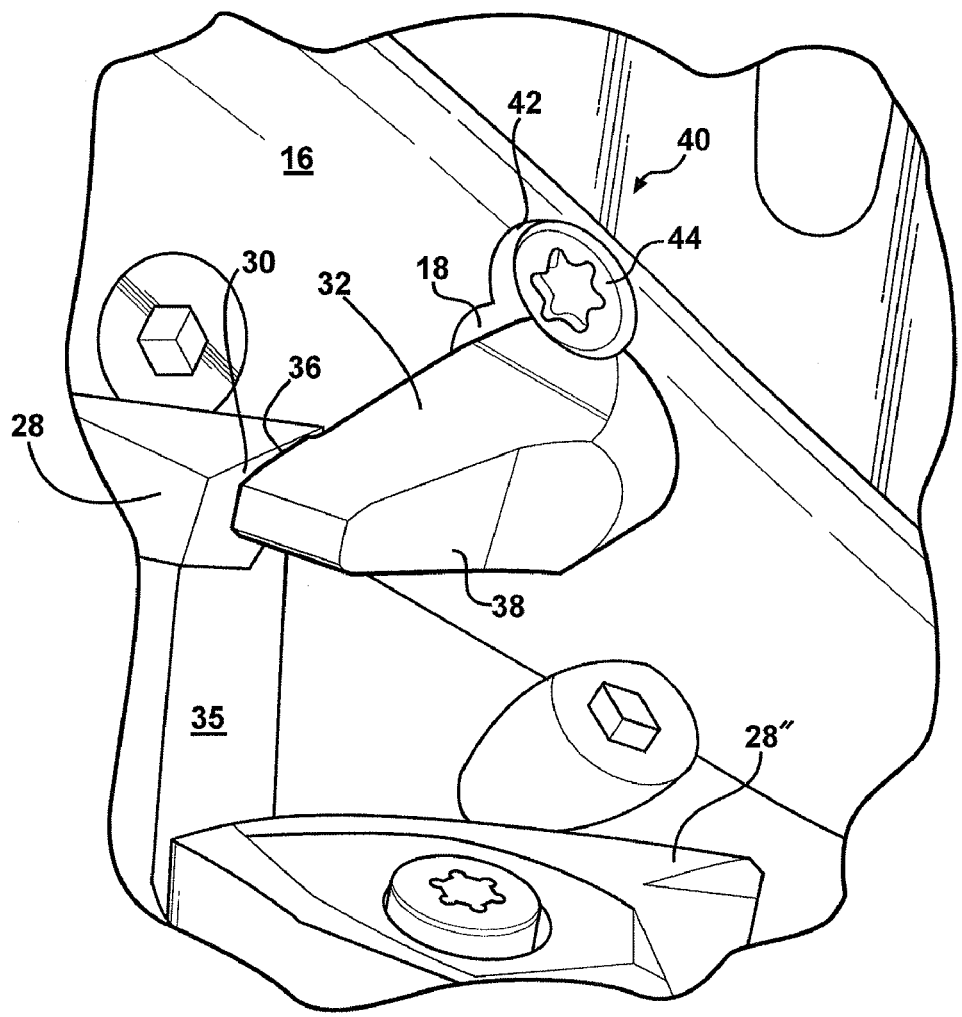
FIG. 3 is an enlarged perspective view of the axial seating pin on the tool body.
Figure 4:
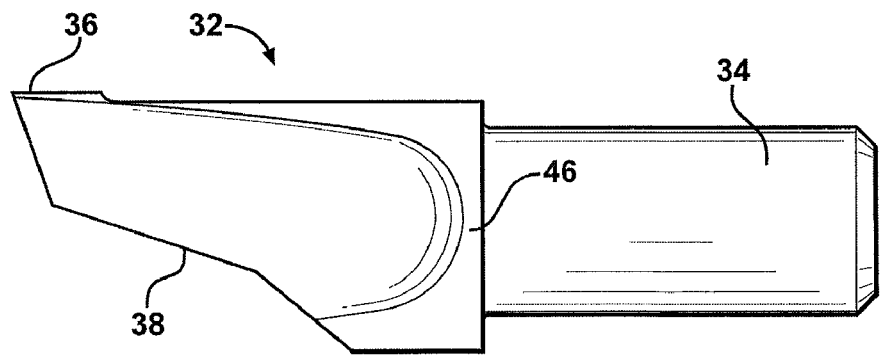
FIG. 4 is a plan side view of the axial seating pin.

Referring generally to FIGS. 2-6 and more specifically to FIG. 2, a perspective view of a cutting tool 10 with an axis 20 is shown. Cutting tool 10 has an axial cutting end 14 which in certain cutting operations makes initial contact with a work piece at an angle generally parallel to the axis 20. There is also a radial peripheral cutting side 15 of the cutting tool 10 that can make initial contact with a work piece at an angle generally perpendicular to the axis 20. The body 12 has one or more flutes 16 formed on its surface. The flutes 16 run parallel to the axis 20 of the cutting tool 10. FIG. 2 depicts each flute 16 extending helically and parallel to the axis 20 of the cutting tool 10; however, virtually any type of pattern can be used.

The body 12 also has one or more pockets 22, 22' formed on its surface for receiving a removable insert 28. The pockets 22 differ from the pockets 22' in that they are located adjacent the cutting end 14 and do not include an axial face 35 which is part of the pockets 22'. The pockets 22, 22' are generally arranged in rows parallel to the axis 20 and each row includes one or more pockets. FIG. 2 depicts several rows of inserts 28, 28'', 28''', 28'''' positioned in their respective pockets 22, 22' in each row. The inserts 28 in the first row are connected to the pockets 22 and are positioned adjacent the cutting end 14 the body 12. The inserts 28'', 28''', 28'''' respectively make up the second, third and fourth rows and are connected to their respective pockets 22'. While FIG. 2 depicts four rows of cutting inserts, it is possible for a cutting tool 10 to have a greater or lesser number of rows. Additionally each row can have one or more pockets 22, 22' with one or more inserts. Thus the scope of this invention is not limited to the number of rows, pockets or inserts found on a particular cutting tool.

The pockets 22, 22' each have a primary bearing face 24 and a radial wall 26 that form part of the pockets 22, 22' for receiving the inserts 28, 28'', 28''', 28''''. Each of the inserts 28, 28'', 28''', 28'''' are fastened to their respective primary bearing face 24 through the use of a fastener 31 that extends through the respective insert and connects to an aperture 33 formed on the primary bearing face 24. As discussed above, the pockets 22' of the second, third, and fourth rows each include the axial face 35 while the pockets 22 of the first row does not. The axial face 35 is not present in the pockets 22 of the first row because the inserts 28 of the first row have two cutting edges; an axial cutting edge 27 and a radial cutting edge 29. While two cutting edges are described it is within the scope of this invention to have more than two cutting edges on inserts 28. The axial cutting edge 27 is the cutting surface that makes initial contact with the work piece on the axial cutting end 14 in operations where the axial cutting end 14 moves against the work piece first. The cutting edge of the radial cutting edge makes initial contact with a work piece on the radial peripheral cutting edge 15 in cutting operations where the radial peripheral cutting edge 15 makes initial contact with the work piece.

The presence of an axial cutting edge 27 causes force to be applied to the inserts 28 in an axial direction as the cutting end 14 moves against a work piece (not shown). This axial force presses the inserts 28 in an axial direction away from the axial cutting edge 27. The inserts 28'', 28''', 28'''' of the second, third, and forth rows only have a radial cutting edge 29 and are further supported in their respective pockets 22' by the axial face 35. Thus the inserts 28", 28''', 28'''' are not subject to the direct axial forces in part because of the presence of the axial face 35 is present. While one cutting edge is described it is also within the scope of this invention to have more than one cutting edge on inserts 28", 28''', 28''''.

Figure 1:
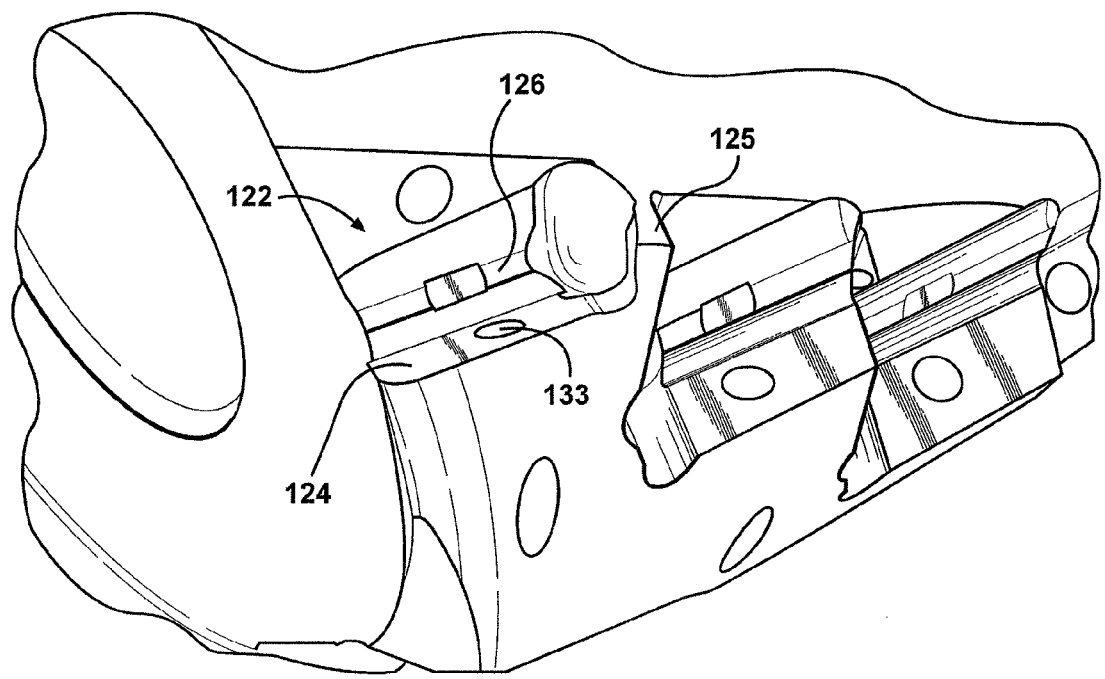
FIG. 1 is an enlarged perspective view of a prior art pocket for receiving an insert.
Figure 6:
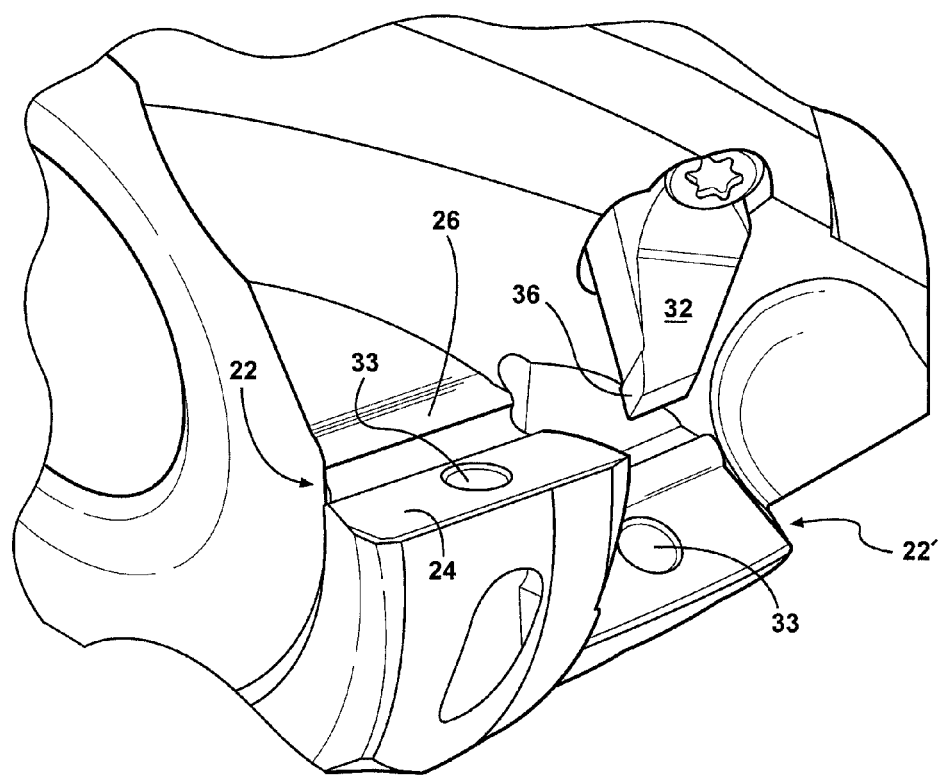
FIG. 6 is an enlarged perspective view of a pocket of the cutting tool and axial seating pin where the insert is removed.

FIG. 6 depicts an enlarged perspective view of the cutting tool 10 pocket 22 shown with the insert 28 removed. This particular view differs from the prior art drawing shown in FIG. 1 in that using an axial seating pin 32 in place of the axial wall 125 eliminates the unwanted breaking or flexing that can occur in the axial wall 125.

The axial seating pin 32 extends at an angle that is generally perpendicular to the axis 20 of the cutting tool 10 and has an abutting face 36 that abuts a face 30 of the insert 28 in order to support the insert 28 during the cutting operation. Axial seating pin 32 also has a face 38 that is contoured or angled in a predetermined manner. The face 38 serves several purposes that include allowing for wrench or tool clearance so that access to the adjacent inserts 28", 28''', 28'''' is not hindered. The face 38 also allows for the clearance of chips that are sheared from the work piece by inserts 28', 28''', 28'''' attached in other rows. For example, as shown in FIG. 2, the face 38 of the axial seating pin 32 allows for the clearance of chips that are removed from the insert 28" of the second row. The angle of the face 38 can have virtually any shape or degree provided that the axial seating pin 32 is thick enough to provide adequate strength to support the insert that the axial seating pin 32 is being used to support.

The axial seating pin 32 has a shank 34 that is configured to slide into a connection point 40 on the body 12. The shank 34 extends axially along the axis of the axial seating pin 32 and terminates at a lip 46 of the axial seating pin 32. The lip 46 is used to attach or fasten the axial seating pin 32 to the body 12 at the connection point 40. The connection point 40 has an aperture 18 that has been formed into the body 12. Although it is not required, it is advantageous to have the aperture 18 formed into one of the flutes 16 so that the connection point 40 will be away from the surface of the body 12 that can come into contact with a work piece during operation. The aperture 18 receives the shank and also has a fastener receiving portion 42 for receiving a fastener 44 that contacts the lip 46 and holds the axial seating pin 32 in place. The fastener receiving portion 42 can be formed as part of the aperture 18 or can be a separate aperture or thread found in the body 12.

Figure 5:
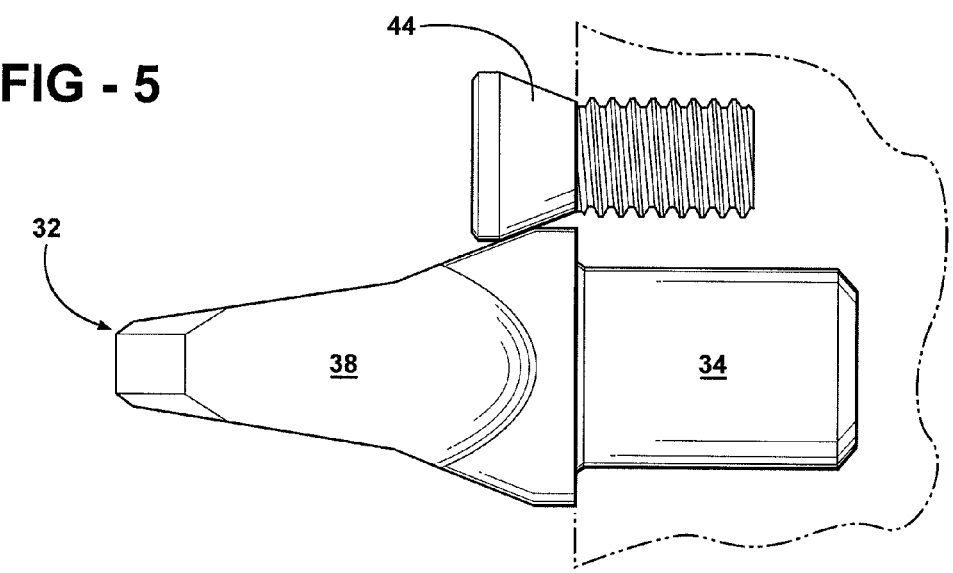
FIG. 5 is a plan view of the axial seating pin and fastener arranged as they are when connected to the cutting tool.

FIG. 5 depicts an overhead plan view of the axial seating pin 32 and fastener 44 with the body 12 of the tool partially shown in phantom. As can be seen the fastener 44 rests against the lip 46 of the axial seating pin 32 to hold the axial seating pin 32 in place against the body 12 of the cutting tool 10. The axial seating pin 32 can easily be removed and replaced with a new axial seating pin if it becomes damaged or worn or if circumstances require an axial seating pin 32 to have a different contoured or angled face 38. The axial seating pin 32 can also be coated with a carbide or titanium coating to further strengthen or extend the life of the axial seating pin 32. The use of the axial seating pin 32 improves the life of the cutting tool 10 because it eliminates damage that can occur to the walls of the pocket 22 which are part of the tool body 12. As discussed above with reference to FIG. 1, prior to the use of the axial seating pin 32, the pocket 122 of the cutting tool 100 body had an axial wall 125 that was integral with the tool body. If the axial wall 125 became damaged then the whole cutting tool 100 had to be replaced. Now with the use of an axial seating pin 32, only the axial seating pin 32 will have to be replaced and the body 12 of the cutting tool 10 will be preserved.

Although the inserts 28", 28''', 28'''' in the other rows are not always subject to direct axial force as the work piece moves against the cutting tool 10, it can be beneficial to support the inserts 28", 28''', 28'''' in the successive rows since vibrations of force can also cause these inserts to move in an unwanted axial direction. Therefore, some embodiments of the present invention can use an axial seating pin 32 to support the inserts 28", 28''', 28''''. FIG. 2 shows this alternative arrangement which has an axial seating pin 32 shown in phantom that supports one of the inserts 28'''. While FIG. 2 only shows one additional axial seating pin 32 a greater or lesser number is within the scope of this invention.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A cutting tool comprising:
   a body having an axis;
   a pocket formed on the surface of said body, said pocket having a primary bearing face and a radial wall;
   an insert removably connected to said primary bearing face and positioned adjacent said radial wall;
   an axial seating pin extending at an angle substantially perpendicular to said axis, said axial seating pin has an abutting face that contacts a face of said insert and prevents said insert from moving axially, wherein said axial seating pin has a shank forming a portion of said axial seating pin configured to slide into an aperture formed on said body and a lip extending from said shank;
   a fastener receiving portion formed separate from or a part of said aperture; and
   a fastener connectable to said fastener receiving portion and configured to contact a portion of said lip such that the axial seating pin does not move axially and does not rotate with respect to said body.

2. The cutting tool of claim 1, wherein said abutting face is positioned adjacent to said primary bearing face and extends perpendicular to said primary bearing face.

3. The cutting tool of claim 1, further comprising a connection point between said body and said axial seating pin wherein said connection point allows for said axial seating pin to be secured to and removably connected to said body.

4. The cutting tool of claim 1, wherein said axial seating pin has a face that is contoured or angled.

5. The cutting tool of claim 1, further comprising one or more flutes on said body and said axial seating pin is connected to said body through a connection point formed in said one or more flutes.

6. The cutting tool of claim 1, wherein the axial seating pin has a flat surface adjacent the insert for limiting the rotation of the insert.

7. A cutting tool comprising:
   a body having an axis;
   an axial cutting end of said body;
   a first row of two or more pockets formed wherein each of said two or more pockets has a primary bearing face and a radial wall, wherein said first row is adjacent said axial cutting end of said body;
   a second row having two or more pockets wherein each of said two or more pockets has a primary bearing face and a radial wall;
   two or more inserts removably connected to each of said two or more pockets of said first row, wherein each insert is removably connected to said primary bearing face of said two or more pockets; and an axial seating pin operably associated with each pocket of said first row, said axial seating pin extends at an angle substantially perpendicular to said axis and said axial seating pin has an abutting face that contacts a face of said insert but is located opposite a cutting edge of said insert, wherein said axial seating pin has a shank forming a portion of said axial seating pin configured to slide into an aperture formed on said body and a lip extending from said shank;

a fastener receiving portion formed separate from or a part of said aperture; and a fastener connectable to said fastener receiving portion and configured to contact a portion of said lip such that the axial seating pin does not move axially and does not rotate with respect to said body.

8. The cutting tool of claim 7, wherein said abutting face is positioned adjacent to said primary bearing face and extends perpendicular to said primary bearing face.

9. The cutting tool of claim 7, further comprising a connection point between said body and said axial seating pin wherein said connection point allows for said axial seating pin to be secured to and removably connected to said body.

10. The cutting tool of claim 7, wherein said axial seating pin has a face that is angled.

11. The cutting tool of claim 7, further comprising one or more flutes on said body and said axial seating pin is connected to said body through a connection point formed in said one or more flutes.

12. The cutting tool of claim 7, wherein the axial seating pin has a flat surface adjacent the insert for limiting the rotation of the insert.

13. A cutting tool comprising:

a body having an axis and an axial cutting end;

two or more rows, each having one or more pockets with one of said two or more rows positioned adjacent said axial cutting end of said body;

each of said one or more pockets having an insert removably connected to said one or more pockets;

one or more axial seating pins operably configured with said one or more pockets, each of said one or more axial seating pins having an abutting face that contacts a face of said insert and prevents said insert from moving axially; and wherein said one or more axial seating pins each have a shank forming a portion of said axial seating pin configured to slide into an aperture formed on said body and a lip extending from said shank, a fastener receiving portion formed separate from or a part each aperture and a fastener connectable to each said fastener receiving portion and configured to contact a portion of said lip such that the axial seating pin does not move axially and does not rotate with respect to said body.

14. The cutting tool of claim 13, wherein said abutting face is positioned adjacent to said primary bearing face and extends perpendicular to said primary bearing face.

15. The cutting tool of claim 13, further comprising a connection point between said body and said one or more axial seating pins wherein said connection point allows for said one or more axial seating pins to be secured to and removably connected to said body.

16. The cutting tool of claim 13, wherein said one or more axial seating pins has a face that is angled.

17. The cutting tool of claim 13, further comprising one or more flutes on said body and said axial seating pin is connected to said body through a connection point formed in said one or more flutes.

18. The cutting tool of claim 13, wherein the axial seating pin has a flat surface adjacent the insert for limiting the rotation of the insert.

\* \* \* \* \*